United States Patent
Campbell et al.

(10) Patent No.: US 10,384,788 B2
(45) Date of Patent: Aug. 20, 2019

(54) MULTIPLE AIRCRAFT SEAT EJECTION MODE SELECTOR

(71) Applicant: GOODRICH CORPORATION, Charlotte, NC (US)

(72) Inventors: Matthew Campbell, Dixon, CA (US); Luis G. Interiano, Galt, CA (US); James Tulloch, Colorado Springs, CO (US); John Hampton, Colorado Springs, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 44 days.

(21) Appl. No.: 15/131,677

(22) Filed: Apr. 18, 2016

(65) Prior Publication Data

US 2017/0297725 A1    Oct. 19, 2017

(51) Int. Cl.
*B64D 25/10* (2006.01)

(52) U.S. Cl.
CPC ..................... *B64D 25/10* (2013.01)

(58) Field of Classification Search
None
See application file for complete search history.

(56) References Cited

U.S. PATENT DOCUMENTS

| | | | | |
|---|---|---|---|---|
| 3,556,442 A * | 1/1971 | Arnekull | ................ | B64D 25/10 244/122 R |
| 3,862,731 A | 1/1975 | McIntyre | | |
| 4,057,206 A | 11/1977 | Duncan et al. | | |
| 4,721,273 A * | 1/1988 | Trikha | ................ | B64D 25/10 244/122 AB |
| 4,911,382 A * | 3/1990 | Aronne | ................ | B64D 25/10 102/207 |
| 5,222,695 A | 6/1993 | Lake | | |
| 6,752,355 B1 * | 6/2004 | Wood | ................ | B64C 1/1476 244/122 A |
| 7,271,713 B2 | 9/2007 | Ayoub et al. | | |

FOREIGN PATENT DOCUMENTS

| | | |
|---|---|---|
| GB | 2327399 A | 1/1999 |
| RU | 2116938 C1 | 8/1998 |
| RU | 2119878 C1 | 10/1998 |

OTHER PUBLICATIONS

GB Search Report for Application No. GB1706086.4 dated Oct. 11, 2017, 5 pages.

* cited by examiner

*Primary Examiner* — Jonathan M Dager
*Assistant Examiner* — Garrett F Evans
(74) *Attorney, Agent, or Firm* — Cantor Colburn LLP

(57) ABSTRACT

A system for selecting an ejection mode on an aircraft may include an egress actuator, a ballistic signal system operatively connected to the egress actuator, and a processor operatively connected to the ballistic signal system and the egress actuator. The processor may be configured to receive, from an aircraft controller, a flight characteristic, and select, based on the flight characteristic, an ejection mode from two ejection modes. The processor may be further configured to receive a pilot egress command from the ballistic signal system, and transmit, to the egress actuator, a signal to actuate the ejection mode from the two ejection modes.

17 Claims, 4 Drawing Sheets

MULTIPLE AIRCRAFT SEAT EJECTION MODE SELECTOR

BACKGROUND

The present disclosure relates to aircraft seat ejection, and more specifically, to an aircraft seat ejection mode selector.

When a pilot activates a seat ejection sequencing system one of two ejection modes are possible, depending on the design and function of the aircraft. High velocity aircraft will employ either a canopy jettison system that may remove the canopy with a rocket motor actuator and eject the pilot into clear space, or a canopy fracturing system that breaks the canopy using energetic materials while ejecting the pilot through it with a feature built into the ejection seat. This latter is the faster ejection sequence between the two systems.

A canopy fracturing system may be the least preferred method of the two systems for high velocity aircraft because of risk of injury to the pilot by canopy fragments moving in the wind stream. A canopy fracturing system can consist of a detonating cord that fractures the canopy transparency into small pieces or it can be a detonating cord that cuts or severs the canopy into larger pieces. Canopy fracturing systems may be installed in aircraft that fly in conditions where it may not be possible to jettison the canopy in advance of ejecting the seat because of the time necessary to actuate the rocket motors of the canopy jettison system to perform the canopy removal. For example, in cases where the aircraft is close to the ground (in vertical takeoff aircraft, for example), the time available for safe ejection may be minimal, and the extra $2/10$-$3/10$ seconds needed to jettison the canopy may exceed the time available to eject the pilot free of the aircraft.

Current ejection systems may not allow the pilot to eject using either the canopy jettison method or the canopy fracturing method because conventional ejection systems do not include both ejection modes combined into a single system. Moreover, conventional systems do not operate in both slow and low flight paths and high altitude and high speed flight paths, to determine the optimal ejection mode based on dynamic flight characteristics such as altitude, airspeed, etc., and configure the ejection system accordingly.

SUMMARY

According to an embodiment of the present invention, a system for selecting an ejection mode on an aircraft may include an egress actuator, a ballistic signal system operatively connected to the egress actuator, and a processor operatively connected to the ballistic signal system and the egress actuator. The processor may be configured to receive, from an aircraft controller, a flight characteristic, and select, based on the flight characteristic, an ejection mode from two ejection modes. The processor may be further configured to receive a pilot egress command from the ballistic signal system, and transmit, to the egress actuator, a signal to actuate the ejection mode from the two ejection modes.

According to an embodiment of the present invention, a method for selecting an ejection mode on an aircraft may include receiving, via a processor, from an aircraft controller, a flight characteristic, selecting, via the processor, based on the flight characteristic, an ejection mode from two ejection modes, receiving, via a ballistic signal system, a pilot egress command, transmitting, via the processor, to an egress actuator, a signal to actuate the ejection mode from the two ejection modes, and actuating the egress actuator based on the selected mode from the two ejection modes.

According to other embodiments, an aircraft configured for selecting an ejection mode may include a canopy, an egress actuator operatively connected to the canopy, a ballistic signal system operatively connected to the egress actuator via one or more ballistic signal paths, an aircraft controller, and a processor operatively connected to the ballistic signal system, the aircraft controller, and the egress actuator. The processor may be configured to receive, from the aircraft controller, a flight characteristic, select, based on the flight characteristic, a mode from two ejection modes, determine a signal path to the egress actuator based on the mode from the two ejection modes, receive a pilot egress command from the ballistic signal system, and transmit, via the signal path to the egress actuator, a signal to actuate the ejection mode based on the determination, and eject the ejector seat based on the selected mode from the two ejection modes.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
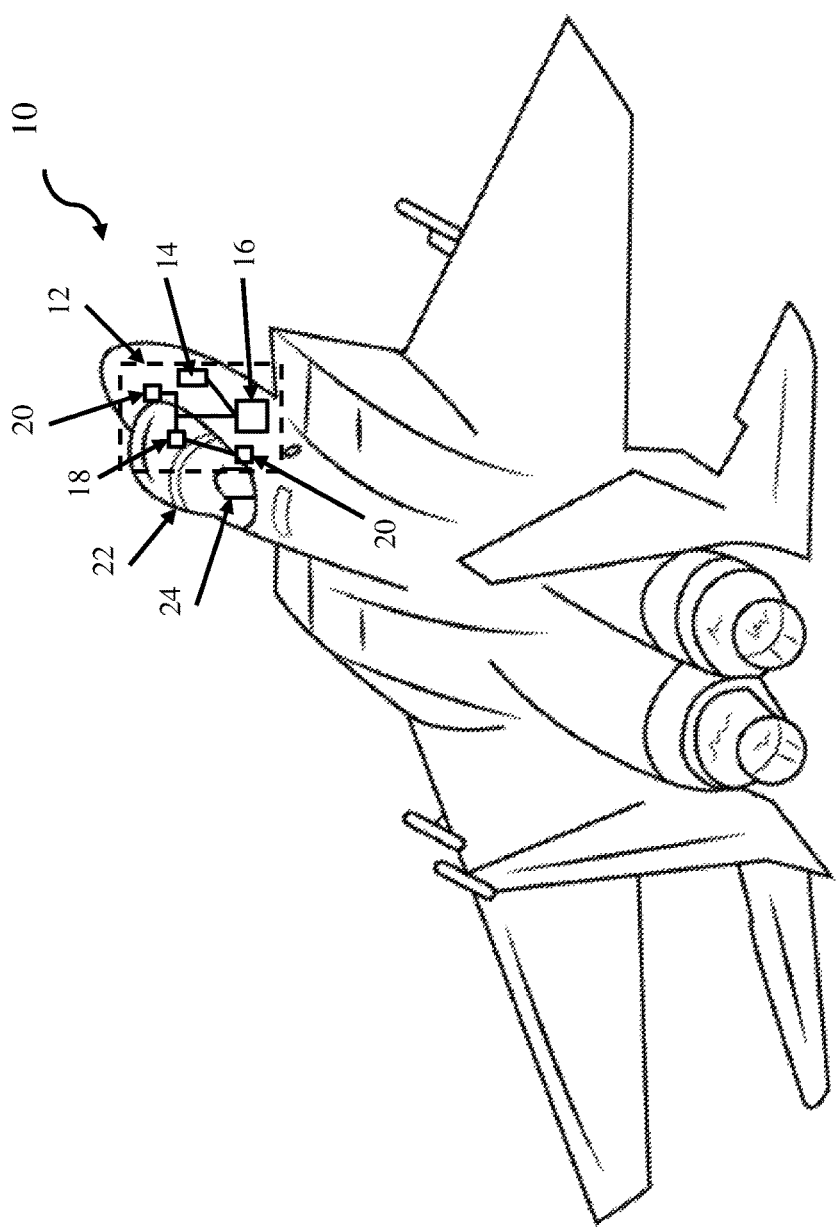
FIG. 1 depicts an aircraft configured for selecting an ejector seat ejection mode according to one embodiment.
Figure 2:
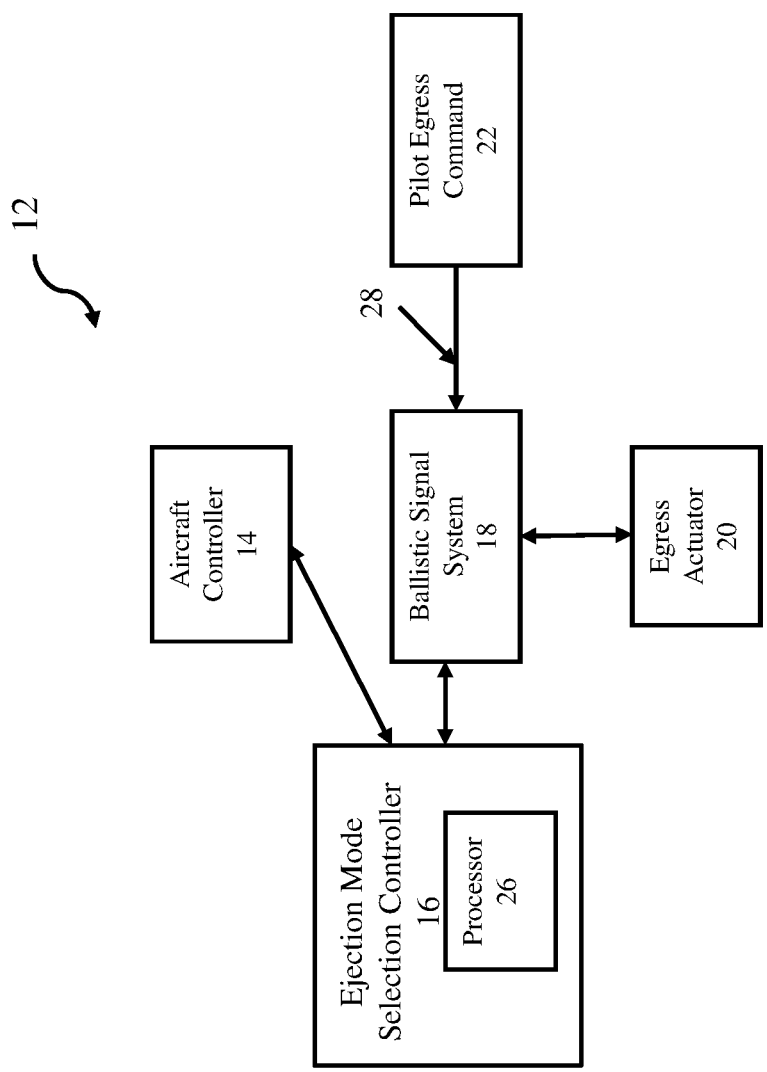
FIG. 2 depicts an ejection mode selection controller according to one embodiment.

FIG. 1 depicts an aircraft configured for selecting an ejection mode, according to one embodiment. Aircraft 10 may include a system for ejection mode selection 12 (described hereafter as "system 12," which shown in greater detail in FIG. 2), including an aircraft controller 14, an ejection mode selector controller 16 (hereafter "selector controller 16"), a ballistic signal system 18, at least one egress actuator 20, a canopy 22, and an ejector seat 24. According to some embodiments, aircraft 10 may be configured to eject an ejector seat 24 (hereafter "seat 24") in one of two ways. First, selector controller 16 may eject seat 24 using canopy jettisoning by actuating egress actuator 20, removing canopy 22, and ejecting ejector seat 24 into the unencumbered airspace above the aircraft 10. Aircraft 10 may also eject seat 24 using canopy fracturing, by ejecting seat 24 through canopy 22. Aircraft 10 may determine, based on flight characteristics, which method to deploy using an ejection mode selection system. FIG. 2 depicts an ejection mode selection system 12, according to one embodiment.

Referring now to FIG. 2, system 12 may include an ejection mode selector controller 16 (hereafter "selection controller 16"). System 12 may further include a ballistic signal system 18, an egress actuator 20, and an aircraft controller 14. Ballistic signal 18 may receive signals from a pilot egress command module 22.

Selector controller 16 may be configured with a processor 26. Processor 26 is a hardware device for executing hardware instructions or software, particularly that stored in a non-transitory computer-readable memory (not shown). Processor 26 can be a custom made or commercially available processor, a central processing unit (CPU), a plurality of CPUs, an auxiliary processor among several other processors associated with aircraft 10, a semiconductor based microprocessor (in the form of a microchip or chip set), or generally any device for executing instructions. Processor 26 may be configured to receive, from aircraft controller 14, one or more flight characteristics, and determine, based on the flight characteristic(s), an ejection mode to be used for ejecting seat 24. For example, processor 26 may select one of two ejection modes that include a canopy jettison system and a canopy fracturing system, either of which are selectable by processor 26 and able to eject seat 24. Processor 26 may also be configured to transmit signals to system 12 including signals to egress actuator 20 to actuate the ejection mode.

Aircraft controller 14 may be operatively connected to selector controller 16, and may provide to selector controller 16 flight information including one or more flight characteristics that indicate flight conditions of aircraft 10. For example, aircraft controller 14 may provide information including flight speed, altitude, aircraft orientation, atmospheric condition, and/or other characteristics to selector controller 16. Processor 26 may use this information to select the ejector seat ejection mode.

According to some embodiments, selector controller 16 may select the ejector seat mode prior to receiving a pilot egress command 21 from ballistic signal system 18. In other aspects, selector controller 16 may select the ejector seat mode in real time based on flight characteristics. Accordingly, prior to issuance of a pilot egress command to eject, selector controller 16 may modify a signal path so that the eject command is routed to the proper actuators (e.g., egress actuator 20) that are part of the egress system. For example, instead of a gas communication channel associated with one mode, selector controller 16 may modify the signal path to an electrical signal path via conductive, or vice versa. Other signal paths are contemplated. In either type of signal path, energetic or electronic, mechanical, pneumatic, etc., selector controller 16 may actuate any number of mechanisms and components to complete pilot egress, which may include, at least, the ejection seat.

Figure 3:
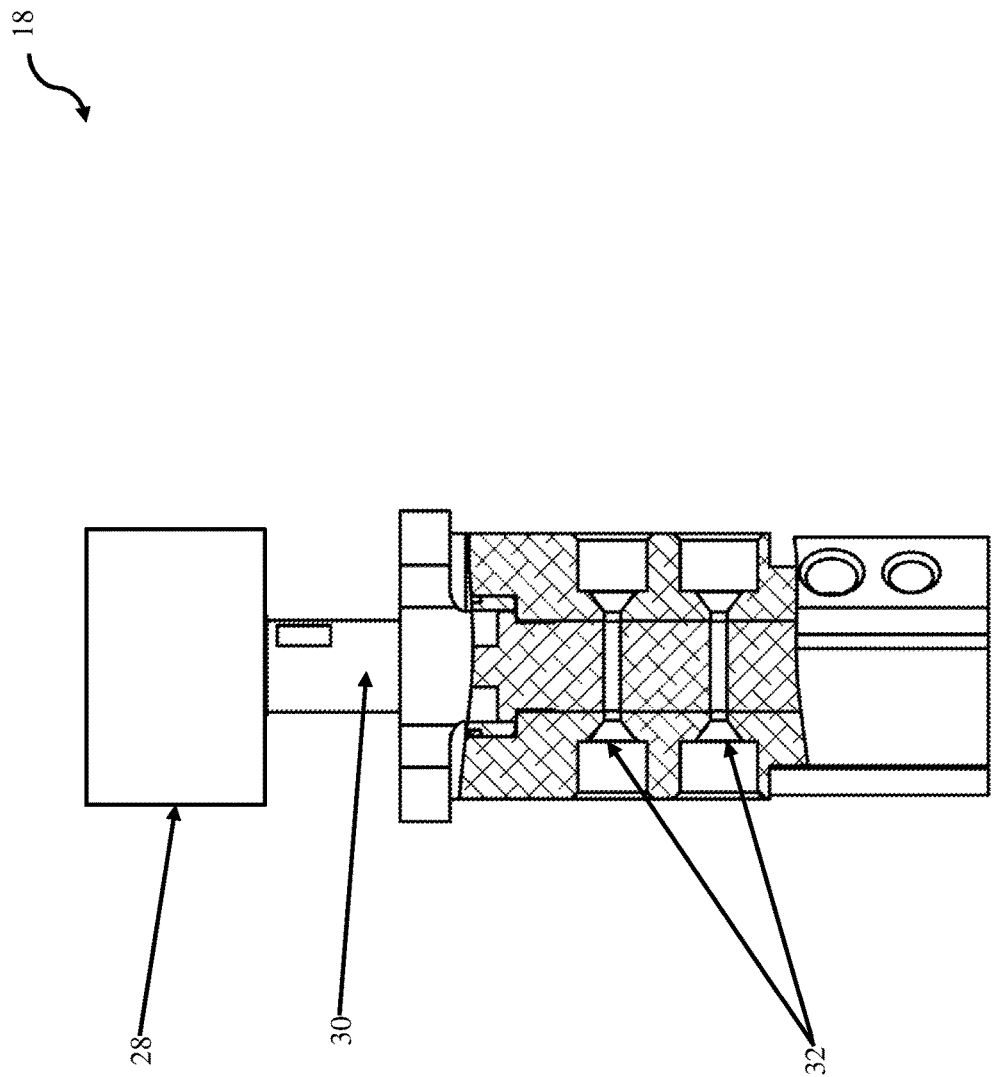
FIG. 3 depicts a portion of a ballistic signal system according to one embodiment.

Ballistic signal system 18 may be configured to receive a signal from processor 26 indicative of an ejection mode for ejecting seat 24. FIG. 3 depicts ballistic signal system 18, according to one embodiment.

Referring briefly to FIG. 3, ballistic signal system 18 may include an actuation module 28, a rotatable component 30, and a plurality of communication channels 32.

Actuation module 28 may be an electrical, mechanical, electromechanical, pneumatic or other motor driven device for receiving a signal from selector controller 16, and rotating rotatable component 30 to a predetermined position based on the signal. Ballistic signal system 18 may be configured to actuate egress actuators 20 using a power source independent of a power system on aircraft 10. There may be a plurality of predetermined positions that align to allow one or more of communication channels 32 to provide a communication signal path to the one or more egress actuators 20. For example, as shown in FIG. 3, communication channels 32 may allow heated gas to operate egress actuator 20. Although gas channels are shown, it should be appreciated that communication channels 32 may be electrical, ballistic, pneumatic, or other means for actuation.

Referring again to FIG. 2, system 12 may further include a plurality of egress actuators 20. Egress actuators 20 may be configured to remove canopy 22 from aircraft 10 after receiving a signal via communication channels 32. Egress actuators 20 may be ballistic, mechanical, electrical, pneumatic, and/or other types of mechanisms for removing or fracturing canopy 22.

Figure 4:
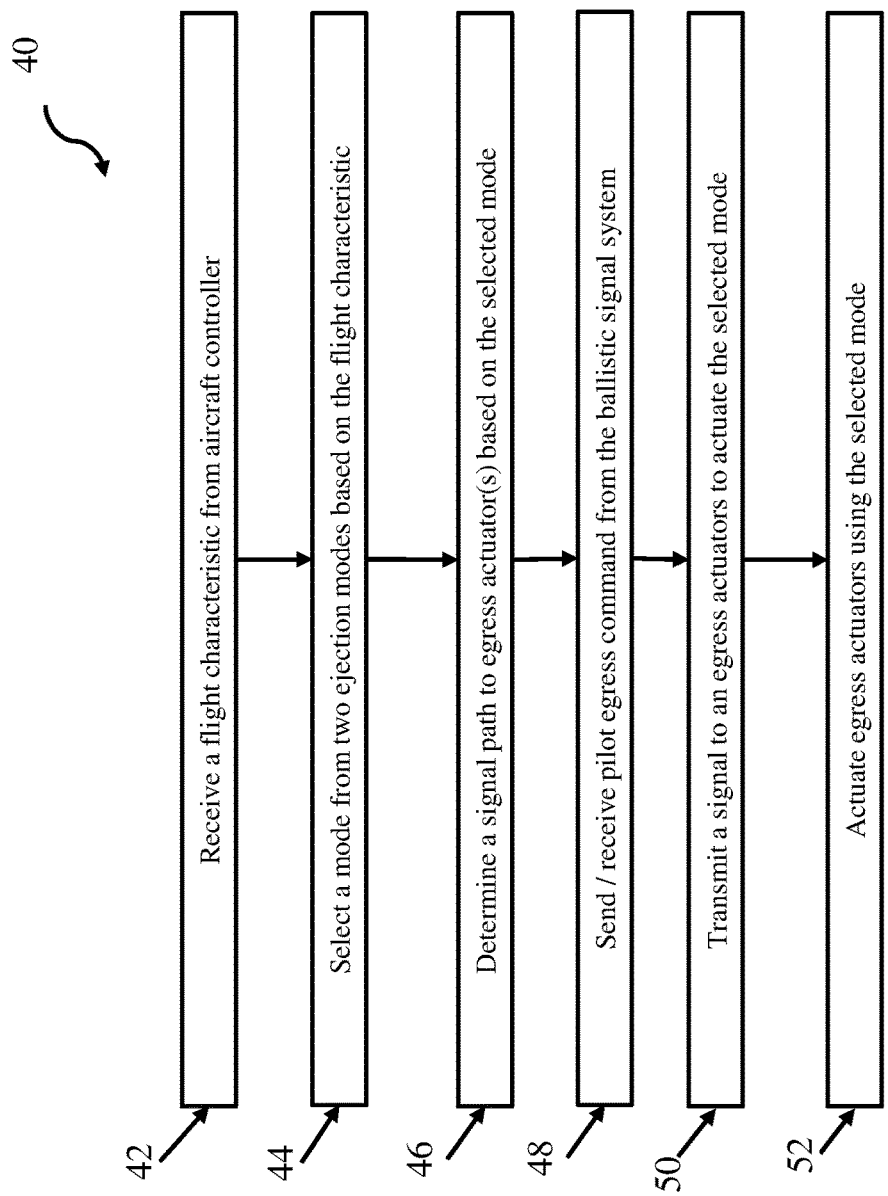
FIG. 4 depicts a flow diagram of a method for selecting an ejector seat ejection mode on an aircraft according to one embodiment.

FIG. 4 depicts a flow diagram of a method 40 for selecting an ejector seat ejection mode on an aircraft (e.g., aircraft 10) according to one embodiment. Referring now to FIG. 4, as shown in block 42, processor 26 may receive, from aircraft controller 14, a flight characteristic. The flight characteristic may include one or more of a flight speed, an altitude, an aircraft orientation, and an atmospheric condition.

As shown in block 44, processor 26 may select, based on the flight characteristic, a mode from two ejection modes. The two ejection modes may include a canopy jettison system and a canopy fracturing system.

If processor 26 receives a pilot egress command either directly or via ballistic signal system 18, processor 26 may determine a signal path to egress actuators 20 to actuate the selected mode, as shown at block 46. The determination may be based on the selected mode.

As shown in block 48, ballistic signal system 18 may send a pilot egress command 22. Pilot egress command 22 may originate from manual actuation indicative of a pilot's command to eject. Accordingly, egress actuators 20 may receive the pilot egress command 22 from either processor 26, as in the case of an electrical signal, or via other communication channels 32, as in the case of an energetic, mechanical, pneumatic, or other signal type.

As shown in block 50, processor 26 may cause ballistic signal system 18 to transmit a signal to the proper egress actuators 20 based on the selected ejection mode and also to the ejector seat 24.

As shown in block 52, processor 26 may actuate egress actuators 20 using the selected mode.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for selecting an ejection mode between two ejection modes on an aircraft having a canopy, the comprising:
   an egress actuator;
   a ballistic signal system operatively connected to the egress actuator that includes an actuation module and a rotatable component; and
   a processor operatively connected to the ballistic signal system and the egress actuator, the processor configured to:
   receive, from an aircraft controller, a flight characteristic; and
   select, based on the flight characteristic, a selected ejection mode from a first ejection mode that causes the canopy to be jettisoned and a second ejection mode that causes a fracture of the canopy;

cause the actuation module to rotate the rotatable component based on the selected ejection mode;
receive a pilot egress command from the ballistic signal system; and
transmit, to the egress actuator, a signal to actuate the selected ejection mode.

2. The system of claim 1, wherein the first and second ejection modes are both operable on the aircraft.

3. The system of claim 1, wherein the flight characteristic includes one or more of a flight speed, an altitude, an aircraft orientation, and an atmospheric condition.

4. The system of claim 1, wherein the ballistic signal system is powered independent of an aircraft power system.

5. The system of claim 1, wherein the ballistic signal system comprises a selector controller configured to receive a pilot egress action, and transmit, based on the pilot egress action, the pilot egress command to the egress actuator.

6. The system of claim 1, wherein the egress actuator is configured to, based on the signal, actuate the ejection mode via the ballistic signal system.

7. A method for selecting an ejection mode on an aircraft comprising:
receiving, via a processor, from an aircraft controller, a flight characteristic;
selecting, based on the flight characteristic, a selected ejection mode from a first ejection mode that causes the canopy to be jettisoned and a second ejection mode that causes a fracture of the canopy;
rotating with an actuation module a rotatable component of a ballistic signal system based on the selected ejection mode;
receiving, via the ballistic signal system, a pilot egress command;
transmitting, via the processor, to an egress actuator, a signal to actuate the selected ejection mode; and
actuating the egress actuator based on the selected ejection mode.

8. The method of claim 7, wherein the first and second ejection modes are both operable on the aircraft.

9. The method of claim 7, wherein the flight characteristic includes one or more of a flight speed, an altitude, an aircraft orientation, and an atmospheric condition.

10. The method of claim 7, wherein transmitting to an egress actuator comprises transmitting, to a ballistic signal system, an instruction to actuate the ejection mode, and the egress actuator sends the signal to actuate the selected ejection mode.

11. The method of claim 10, wherein the ballistic signal system is powered independent of an aircraft power system.

12. The method of claim 7, further comprising:
receiving, via a selector controller in the ballistic signal system, a pilot egress action, and
transmitting, via the processor, based on the pilot egress action, a pilot egress command to the egress actuator.

13. An aircraft configured for selecting an ejection mode comprising:
a canopy;
an egress actuator operatively connected to the canopy
a ballistic signal system operatively connected to the egress actuator via one or more ballistic signal paths, wherein the ballistic signal system comprises a selector controller configured to receive a pilot egress signal, and transmit, based on a pilot egress action, a pilot egress command to the egress actuator, the ballistic signal system including an actuation module and a rotatable component;
an aircraft controller; and
a processor operatively connected to the ballistic signal system, the aircraft controller, and an egress actuator, the processor configured to:
receive, from the aircraft controller, a flight characteristic;
select, based on the flight characteristic, a selected ejection mode from a first ejection mode that causes the canopy to be jettisoned and a second ejection mode that causes a fracture of the canopy;
determine a signal path to the egress actuator based on the selected mode;
cause the rotatable component to rotate based on the selected ejection mode;
receive the pilot egress command from the ballistic signal system;
transmit, via the signal path, to the egress actuator, a signal to actuate the selected ejection mode based on the determination; and
eject the ejector seat.

14. The aircraft of claim 13, wherein the first and second ejection modes are both operable on the aircraft.

15. The aircraft of claim 13, wherein the flight characteristic includes one or more of a flight speed, an altitude, an aircraft orientation, and an atmospheric condition.

16. The aircraft of claim 13, wherein the processor is configured to send an instruction to actuate the ejection mode to a ballistic signal system, and the egress actuator sends the signal to actuate the ejection mode.

17. The aircraft of claim 13, wherein the ballistic signal system is powered independent of an aircraft power system.

* * * * *